United States Patent
Ahlstrom

(10) Patent No.: US 8,673,145 B2
(45) Date of Patent: Mar. 18, 2014

(54) SYSTEM FOR TREATING FAECES

(76) Inventor: Rolf Ahlstrom, Gavle (SE)

( * ) Notice: Subject to any disclaimer, the term of this patent is extended or adjusted under 35 U.S.C. 154(b) by 562 days.

(21) Appl. No.: 12/993,004

(22) PCT Filed: Apr. 29, 2009

(86) PCT No.: PCT/SE2009/050461
§ 371 (c)(1),
(2), (4) Date: Nov. 16, 2010

(87) PCT Pub. No.: WO2009/139695
PCT Pub. Date: Nov. 19, 2009

(65) Prior Publication Data
US 2011/0067466 A1  Mar. 24, 2011

(30) Foreign Application Priority Data
May 16, 2008  (SE) .................. 0801121-5

(51) Int. Cl.
*C05F 3/06* (2006.01)
*B01F 3/04* (2006.01)
(52) U.S. Cl.
CPC ............ *C05F 3/06* (2013.01); *B01F 3/04539* (2013.01); *B01F 3/04602* (2013.01)
USPC .......... 210/219; 210/220; 210/256; 422/225; 261/87
(58) Field of Classification Search
CPC ............ B01F 3/04531; B01F 3/04539; B01F 3/04602; C05F 3/06
USPC .......... 422/225, 227, 228; 241/46.17; 261/87; 210/256, 220, 219
See application file for complete search history.

(56) References Cited

U.S. PATENT DOCUMENTS

| 3,796,417 A | 3/1974 | Kaelin |
| 3,923,605 A | 12/1975 | Gedde |
| 5,641,127 A | 6/1997 | Masumura |

FOREIGN PATENT DOCUMENTS

| CA | 2232581 A | 3/1997 |
| EP | 1156870 B1 | 11/2001 |
| WO | 0041802 A1 | 7/2000 |

OTHER PUBLICATIONS

International Search Report, dated Jul. 10, 2009, from corresponding PCT application.

*Primary Examiner* — Terry Cecil
(74) *Attorney, Agent, or Firm* — Young & Thompson

(57) ABSTRACT

An apparatus for the treatment of faeces, includes a tank (200) for housing faeces that has been subjected to treatment. There is a process vessel (202) in which the faeces is treated and which is located inside the tank (200) having an inlet (204) for feeding faeces into the process vessel (202). A rotary device (300) is provided for stirring the faeces in the process vessel (202) and for introducing oxygen into the faeces, which is operable in two modes of operation at different speeds of rotation. A partitioning member (212) separates the interior of the process vessel in a lower (216) and an upper (218) portion, while at the same time allowing communication between the lower and upper portions. The rotary device (300) is arranged to at least cause a suction of material mainly from the lower compartment in a first mode of operation and into the rotary device.

14 Claims, 3 Drawing Sheets

SYSTEM FOR TREATING FAECES

The present invention relates to apparatus for the efficient treatment, namely wet composting of faeces, and to a method for such treatment.

BACKGROUND OF THE INVENTION

In many developing countries the population does not have access to modern sewage systems for taking care of faeces. Instead, usually one simply digs a hole in the ground wherein people relieve themselves. Eventually the hole is covered and the faeces is left to undergo a natural breakdown.

However, this usage inevitably causes certain sanitary problems that might be the cause of diseases.

In many of these countries also the agriculture is not particularly developed. For example fertilizers being expensive are rarely used, and the availability of natural manure is not always good.

With proper handling, human faeces could be use as fertilizer and would thereby contribute positively to agriculture.

In EP 1 156 870 (Ahlström) there is disclosed a device and method for the treatment of contaminated media. It is based on a very efficient oxygenation by a rotary impeller device that creates a very vigorous suction and mixing of air into the contaminated media.

SUMMARY OF THE INVENTION

In view of the above, the object of the present invention is to provide an apparatus and a method for treating human faeces that will in the first place eliminate the health problem caused by the presently used primitive latrines, and secondly will produce valuable fertilizer directly usable by farmers.

Figure 1:
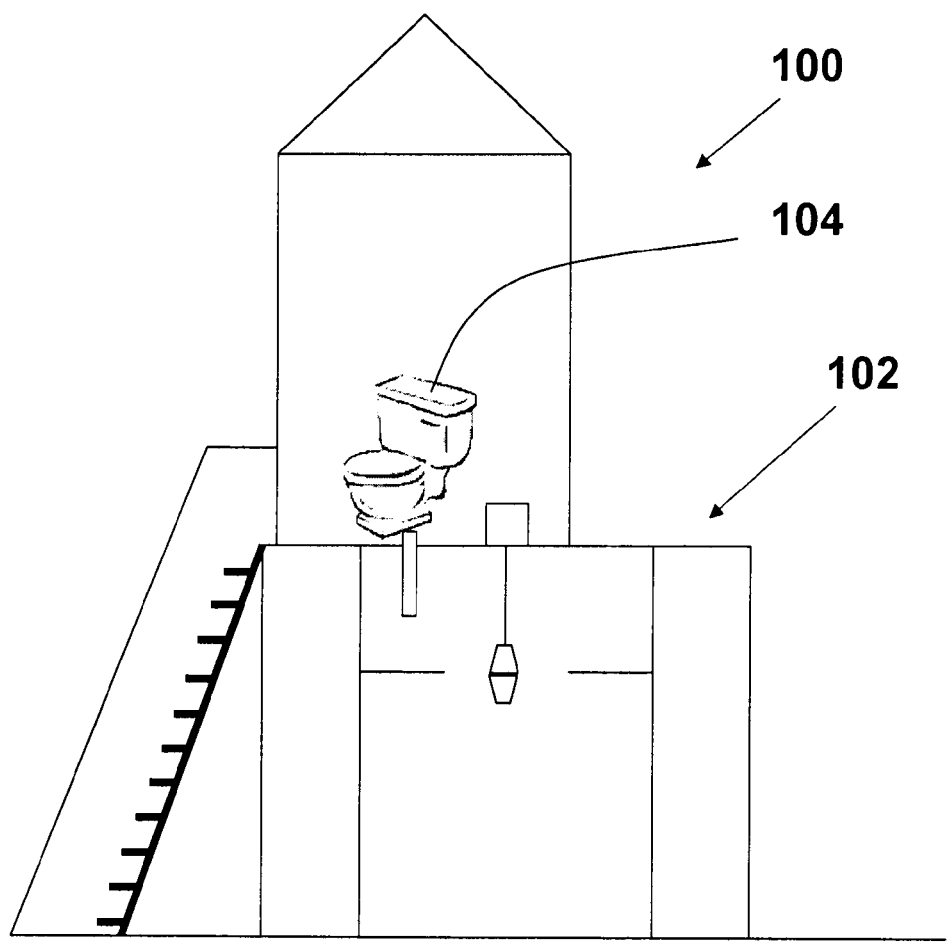
Figure 2:
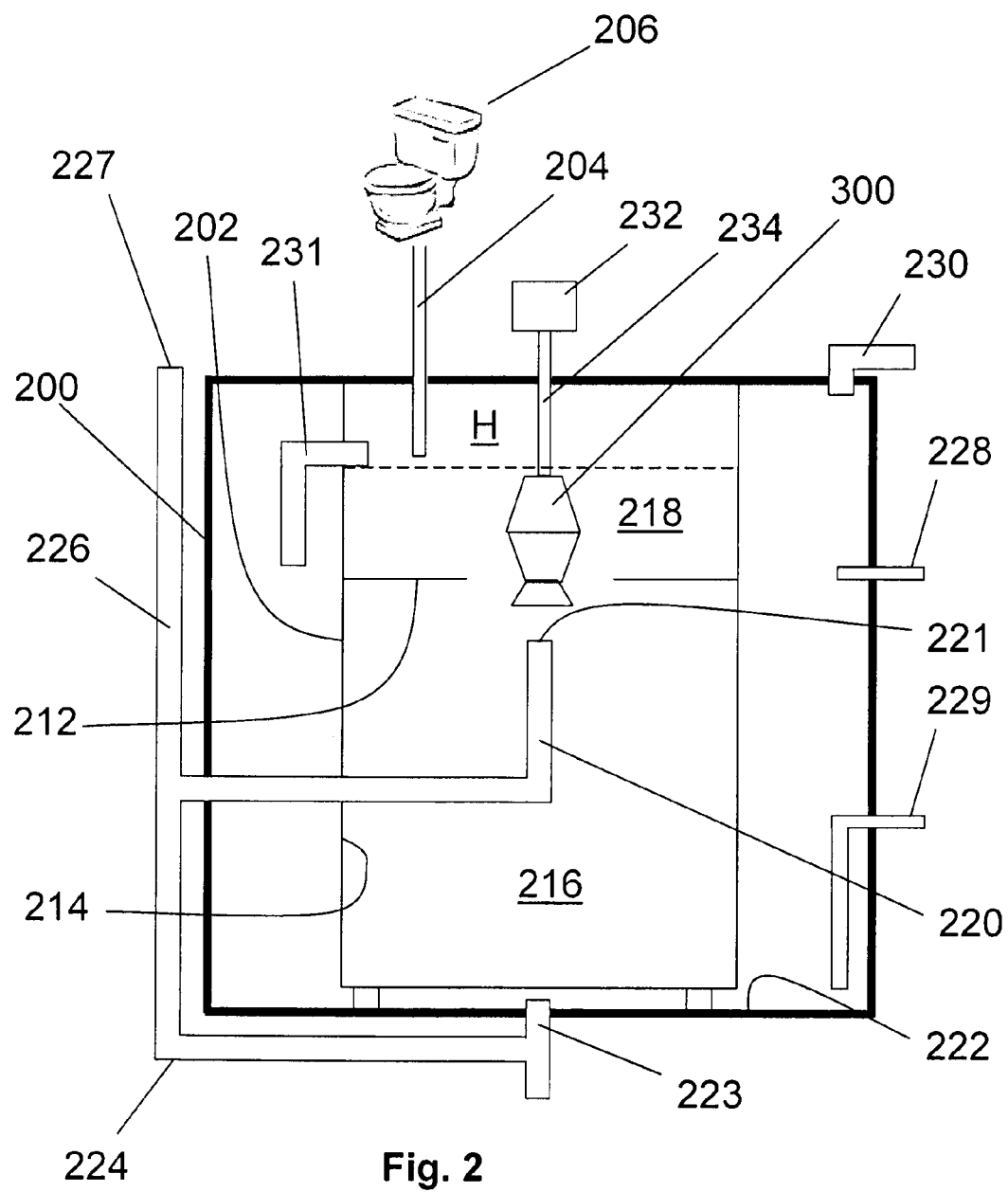
Figure 3:
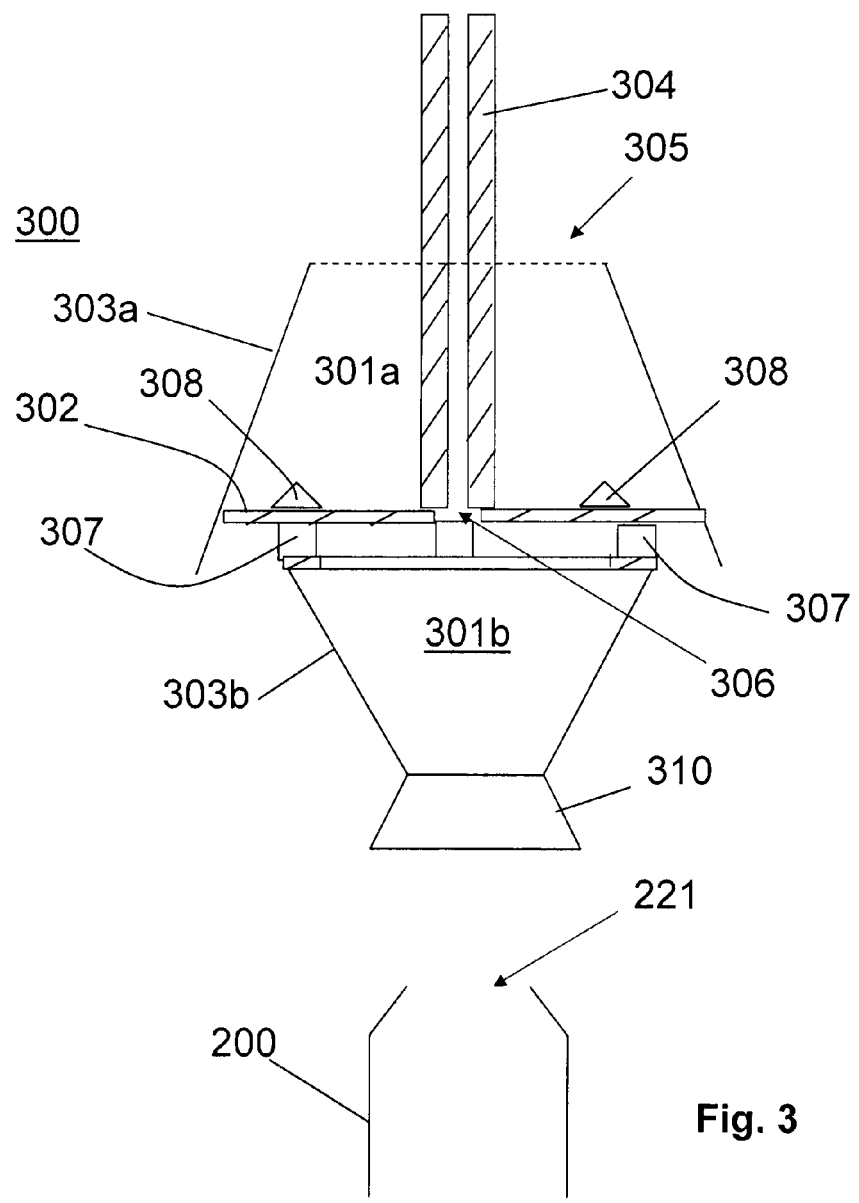

Further scope of applicability of the present invention will become apparent from the detailed description given hereinafter and the accompanying drawings which are given by way of illustration only, and thus not to be considered limiting on the present invention, and wherein FIG. 1 illustrates schematically an implementation of the apparatus of the invention in a lavatory;

FIG. 2 illustrates schematically an embodiment of an apparatus according to the invention; and FIG. 3 illustrates a cross-section of a rotary device used in the apparatus according to the invention.

DETAILED DESCRIPTION OF PREFERRED EMBODIMENTS

FIG. 1 schematically illustrates a lavatory 100 to be used by an individual household in e.g. a farmers village in a developing country, where there is no communal infrastructure, and wherein an apparatus 102 according to the invention (schematically shown) has been implemented. The lavatory would suitably be located near the house, such that the inhabitants will be able to easily access it on a frequent basis, thereby eliminating the need for digging latrine holes in the ground. A standard size of the apparatus could serve say 5-10 people. For ease of handling, the actual apparatus 102 will be placed on the ground, and the toilet room will be placed on top, thus requiring a staircase to gain access thereto.

Of course the apparatus can be implemented to serve several households too, in which case the lavatory suitably would be located in the centre of a village. Depending on the size of the village there could of course be provided several lavatories.

To the apparatus there will be coupled one or more toilets 104 suitably of a "mill" type, which is preferred because of its function to fragment the material. The apparatus according to the invention will treat the urine and faeces on a continuous basis and rapidly transform the faeces to virtually bacteria free harmless end products in the form of a nitrate-rich liquid phase and a phosphorous-rich slurry or semi-solid phase. These end products can be directly pumped or transported onto nearby fields to provide cheap fertilizer and thereby increase crops.

The apparatus constitutes a self-contained system for taking care of faeces and treating it to produce cheap fertilizer thereby improving life for poor farmers in developing countries.

Now the working and structure of the apparatus will be described in more detail with reference to FIG. 2.

Thus, the apparatus comprises a housing or tank 200 wherein the treated faeces is stored temporarily before it is pumped or otherwise transported to the end use as fertilizer in the fields.

Inside the tank 200 there is provided a process vessel 202. The process vessel suitably has a circular cylindrical cross section. There is also an inlet tube 204 at the top of the vessel 202 through which faeces from a suitable toilet 206 will be fed into the process vessel 202.

Inside the process vessel 202 there is provided a member that is referred to as a guide collar 212. This is a flange or rim running circumferentially along the inner wall 214 of the vessel 202 at a height above the bottom of the vessel 202 corresponding to about $2/3$ to $3/4$ of the total height of the vessel 202. This guide collar 212 extends horizontally inwards, i.e. radially, from the inner circumferential wall 214 so as to leave a central opening having a diameter that is between $1/3$ and $4/5$ of the diameter of the vessel 202 itself. Thus, the guide collar in a sense partitions the process vessel 202 in a lower 216 and an upper 218 compartment, respectively.

Located in the centre of the vessel 202 there is a tube 220. The tube 220 has an aperture 221 slightly lower that the level of the guide collar 212. The tube 220 is drawn through the wall of the process vessel 202, and further through the wall of the tank 200. It is connected to the bottom 222 of the tank at 223 via a branch tube 224. Thereby it will be possible to circulate the material located at the bottom of the tank 200 back into the process vessel 202 in a manner to be described.

Another branch 226 of the tube 220 extends upwards and opens 227 at a level above the top level in the tank 200. This provides overflow protection in the event that the tank should be completely filled.

At a level above half of the height of tank 200 there is provided a drainage 228 for $NO_3$-rich supernatant. This liquid can be used directly as a fertilizer by pumping it into the fields. There is also provided at a lower level a drainage 229 for phosphorous-rich sludge collecting at the bottom of the tank 200. This material can also be used directly as fertilizer. At the top of that tank 200 there is also provided a vent 230 for $CO_2$ and other gases from inside the tank.

There is also provided an overflow feed tube 231 which ascertains that treated material continuously will be fed into the storage tank 200. This overflow feed tube is located at a level such that there is formed a head space H above the liquid inside the process vessel 202. The normal level inside the process vessel 202 is indicated with a broken line in FIG. 2.

The key component of the apparatus is a rotary impeller device 300 of a similar construction to that of the device mentioned in the Background section. The impeller 300 is positioned substantially within the upper portion of the process vessel 202, i.e. at a position above the level of the guide collar 212. However, it preferably extends slightly below the collar. The impeller 300 is driven by a motor 232 the speed of which can be controlled to at least two different speeds. The impeller 300 is connected to the motor via a shaft 234 which is hollow for the purpose of supplying air to the process vessel 202. The motor 232 is suitably an electric motor, but in cases where electricity is not available, diesel engines or other types of combustion engines could be used instead. It is also conceivable to use solar power or wind power to generate the required electric energy, which can be stored in batteries.

The impeller 300 is similar in construction to the device disclosed and claimed in EP 1 156 870, but with some modifications to render it suitable for the purpose of the present invention. The details of the impeller will now be described separately below with reference to FIG. 3.

Thus, the impeller, generally indicated with reference numeral 300 in FIG. 3, is suitably made of stainless steel (although other resistant materials such as various types of plastics are equally possible), and comprises two distinct portions; an upper compartment 301a and a lower compartment 301b separated by a partition plate 302. A driving shaft 304 is attached to the partition plate 302 in the centre thereof. The shaft is hollow to enable ambient air to be drawn into the lower compartment 301b via a hole 306 in the partition plate 302.

The upper compartment 301a is formed by a truncated cone 303a having the narrower part thereof facing upwards such as to leave an annular opening 305 around the centrally located shaft 304. The truncated cone 303a is preferably welded to the partition plate 302. There are provided openings 308 in the wall of the upper compartment 301a. These are circumferentially spaced along the periphery of the compartment wall, preferably near the partition plate 302, most preferred such that the lower edge of the openings is flush with the partition plate. Suitably there are four such openings, although two or three or five or more openings are possible. The purpose and function of the upper compartment will be described below in connection with the description of the operation of the apparatus according to the invention.

The lower compartment 301b is also formed by a truncated cone 303b having the narrower part thereof facing downwards. This truncated cone 303b is attached to the bottom side of the partition plate 302 via impeller blades 307, distributed evenly along the periphery of the cone 303b. The impeller blades form spacers between the cone 303b and the partition plate 302, so as to provide a peripheral opening for liquid to pass out from the compartment 301b during the treatment. Preferably there are six impeller blades, although this number is not critical. There could be four or five or even seven up to ten or more blades. The width of the "slit" formed between the truncated cone 303b and the partition plate typically could be 15 mm if the diameter of the entire impeller is 150 mm. The slit width will vary with size of the impeller, and thus a large diameter will yield a correspondingly larger slit width.

At the periphery of the opening at the narrow end of the truncated cone, there is collar 310, also in the form of a truncated cone but arranged such that it widens downwards, i.e. it has an opposite orientation compared to the cone forming the lower compartment 301b.

The height of this "collar cone" 310 from its wider opening up the joint with the larger compartment forming cone is preferably about 30% of the height of the larger cone, but can vary from 25 to 35%, but could be substantially larger without departing from the inventive idea or negatively impart the function. The lower circumference of this collar cone 310 is located slightly below the level of the guide collar 212.

Furthermore, and an important feature, is that the cone angles α of the cone forming the compartment 301b and the collar cone 310 should be the same. Suitably this angle α is about 60° but can vary within certain limits such as 65 to 75°, or 60 to 80°.

Now the operation of the apparatus according to the invention will be described with reference to FIGS. 1-3.

The apparatus according to the present invention can be run in two modes. A first "treatment mode" in which freshly collected faeces is treated, and a second "maintenance mode", in which material is treated that has been stored long enough that unwanted odours have started to develop. Also, unwanted bacterial growth can be inhibited by this second mode operation.

The first mode will now be described.

When the toilets 206 are used, faeces will be fed via the inlet tube 204 and into the process vessel 202. Initially of course the system is empty, and the treatment of the material will not begin until the process vessel is filled to the set level, defined by the position of the overflow feed tube 231.

At this point in time, i.e. when the process vessel is adequately filled, the motor 232 will be started to initiate stirring of the faeces by means of the impeller 300. Once the system is up and running the motor will run continuously. In the first mode the speed of rotation of the impeller is in the order of 750 rpm but can be up to about 1000 rpm. This will cause the material inside the vessel 202 to rotate forming a vortex. At this speed the liquid or semi-liquid material located at or near the walls in the process vessel, in the region below the guide collar 212, will be drawn upwards and into the impeller 300. The collar cone 310, by virtue of its cone shape, will support the flow into the impeller to render the transport more efficient.

The guide collar 212 will effectively function as a partition wall between the upper and lower part of the process vessel, thereby preventing material that has been treated inside the impeller to mix too rapidly with untreated material below the collar 212. Eventually of course the material will in some sense be "homogeneous", and only when new material is fed into the system an inhomogeneous situation occurs and the process of oxygenation will become operative.

Due to the construction of the impeller 300 with its truncated cone configuration, there will be created a suction due to the formation of a vortex inside the lower compartment 301b of the impeller 300. Thereby, air from the environment will be sucked in through the hollow shaft, and also liquid will be sucked in through the collar cone 310 at the lower end of the impeller.

In the extreme conditions inside compartment 301b there will a very efficient oxygenation of the faeces material, and a rapid nitrification process will take place thereby eliminating ammonia formation, and also killing of bacteria will be very rapid.

The upper part of the impeller 300, i.e. the compartment 301a, will have dual functions.

First of all it will cause a suction into the upper opening 305, such that newly introduced faeces will very rapidly enter there into and mix with air that is also sucked in from the head space H in the vessel 202. The material will then be thrown out through the peripheral openings 308 and back into the upper portion 218 in the vessel 202.

During running of the impeller, proteins and other biological material in the faeces will cause heavy foaming. However, due to the construction of the impeller with an upper portion 218 as described above, foam that is generated will be drawn in from the surface of the media in the vessel and disintegrate in the process of passing through the upper compartment 301a. Thus, use of anti-foaming agents, common in sewage treatment systems is eliminated.

Now the second mode of operation will be described.

When the system has been run for a while, and if the treated material has been stored in the tank 200 for more than say 24 hours inevitably there will be e.g. H$_2$S generated together with other unwanted gases, such as ammonia, and as mentioned above, bacterial growth may have reached an unwanted level.

In order to stop this unwanted process, the material from the tank 200 can be recirculated into the process vessel for further treatment. This is achieved by increasing the speed of rotation of the impeller 300 to about 1500 rpm. This will cause the vortex formed by the impeller at the lower opening to be more directed and actually essentially focussed to the tube 220 and down into it through the opening 221. As can be seen in FIG. 2, the tube 220 extends via the branch 224 to the bottom of tank 200. Thus the suction caused by the impeller 300 in this second mode of operation will transport material from the bottom of the tank 200 back into the process vessel 202, where it will undergo the same treatment again as it already once have undergone.

The second mode of operation can be triggered by sensors (not shown) capable of detecting e.g. H$_2$S and ammonia, and when the level has reached a threshold level the second mode of operation will be initiated.

Alternatively, the second mode could be subject to time control, i.e. the system will automatically go into second mode at certain time intervals.

In a preferred embodiment, the second mode of operation will be the idle mode, i.e. the first mode will be triggered to become operative when fresh faeces has been fed into the process vessel.

Although the invention has been described with reference to use by humans, the apparatus is suitable for use also with animal dung and excrements, provided the viscosity thereof is suitable for stirring as contemplated using the rotary device disclosed herein.

The invention claimed is:

1. An apparatus for the treatment of faeces, comprising:
    a tank (200) for housing faeces that has been subjected to treatment;
    a process vessel (202) in which the faeces is treated and which is located inside the tank (200);
    an inlet (204) for feeding faeces into the process vessel (202);
    a rotary device (300) for stirring the faeces in the process vessel (202) and for introducing oxygen into the faeces, said rotary device, comprising
    an upper compartment (301a) and a lower compartment (301b) separated by a partition plate (302);
    a hollow driving shaft (304) attached to the partition plate (302) in the center thereof, and that communicates with the lower compartment (301b) via a hole (306) in the partition plate (302), the hollow driving shaft (304) supplying air to the process vessel (202) during rotation of the rotary device (300),
    wherein the upper compartment (301a) is formed by a truncated cone (303a) having the narrower part thereof facing upwards such as to leave an annular opening (305) around the centrally located shaft (304), and further having openings (308) provided in the wall of the upper compartment (301a), and
    wherein the lower compartment (301b) is also formed by a truncated cone (303b) having the narrower part thereof facing downwards, said cone (303b) being attached to the bottom side of the partition plate (302) via impeller blades (307), distributed evenly along the periphery of the cone (303b), thereby forming a peripheral opening from the compartment (301b);
    a motor (232) that drives the rotary device (300) in at least a first mode of operation and a second mode of operation, the first mode corresponding to a first speed of rotation and the second mode of operation corresponding to a second speed of rotation higher than the first speed of rotation;
    a tube (220) communicating with the tank (200), and which has an opening (221) in vertical registration beneath the rotary device (300); and
    a partitioning member (212) separating the interior of the process vessel (202) in a lower (216) and an upper (218) portion, while at the same time allowing communication between said lower and upper portions (216, 218),
    wherein the rotary device (300) is arranged to at least cause a suction of material mainly from the lower compartment (216) in the first mode of operation and into the rotary device (300), and
    wherein in the second mode of operation, the rotary device (300) causes a suction of treated material at least from the tank (200) and into the rotary device (300) so as to cause a maintenance treatment of stored material.

2. The apparatus as claimed in claim 1, wherein said tube is in fluid communication with the bottom of the storage tank (200).

3. The apparatus as claimed in claim 1, comprising means (228, 229) for emptying the storage tank of material at different levels.

4. The apparatus as claimed in claim 1, comprising a toilet coupled to the inlet (204).

5. The apparatus as claimed in claim 4, wherein said toilet is a mill type toilet.

6. A method of treating faeces comprising the steps of:
    feeding fragmented faeces to a process vessel located inside a storage tank in an apparatus according to claim 1;
    stirring the faeces vigorously within the process vessel while supplying air to mix it thoroughly with oxygen;
    letting treated faeces flow over to the storage tank.

7. The method of claim 6, comprising the further step of feeding stored and treated material from the storage tank into the process vessel for further treatment, the treated material being in a form of a nitrate-rich liquid phase and a phosphorous-rich slurry usable as a crop fertilizer.

8. The apparatus of claim 1, wherein the first speed is in a range of 750 rpm to 1000 rpm, and the second speed is 1500 rpm.

9. The apparatus of claim 1, further comprising:
    a nitrate-rich supernatant drainage (228) located at a level above half of the height of tank (200) that allows liquid, usable directly as a fertilizer, to be discharged from the tank; and
    phosphorous-rich sludge drainage (229) located at a lower level that allows collection of the phosphorous-rich sludge from the bottom of the tank 200.

10. An apparatus for the treatment of faeces and production of a crop fertilize in a form of a nitrate-rich liquid phase and a phosphorous-rich sludge, comprising:
    a tank (200) wherein faeces is stored temporarily before being transported to an end use as the crop fertilizer, the tank having a top level, an outside wall, and a bottom;
    a process vessel (202) inside the tank (200), the process vessel having a circular cylindrical cross section and a faeces inlet tube (204) at a top of the vessel (202)

through which faeces from a toilet discharge line (204) is fed into the process vessel (202);

a guide collar (212) inside the process vessel (202), the guide collar (212) defining a rim running circumferentially along an inner circumferential wall (214) of the vessel (202), the guide collar (212) extending horizontally inwards from the inner circumferential wall (214) so as to leave a central opening, wherein the guide collar partitions the process vessel (202) into a lower compartment (216) and an upper (218);

a tube (220) located in a center of the vessel (202), an aperture (221) of the tube (220) being located adjacent the central opening of the guide collar (212), the tube (220) extending through the inner circumferential wall (214) of the process vessel (202) and through the outside wall of the tank (200);

a first branch tube (224) connecting the tube (220) to the bottom (222, 223) of the tank (223) to thereby define a material circulating path for material located at the bottom of the tank (200) back into the process vessel (202);

overflow feed tube (231) with an outlet that feeds treated material to an inside of the tank (200) and an inlet extending through the inner circumferential wall (214) to feed the treated material out from the process vessel (202) into the tank (200);

a rotary device (300) comprising an impeller (300), the impellor positioned substantially within the upper portion of the process vessel (202), at a position above the level of the guide collar (212), with a minor portion of the rotary device (300) extending below the collar proximate the aperture (221) of the tube (220), wherein the impeller comprises an upper compartment (301a) and a lower compartment (301b) separated by a partition plate (302) comprising a hole (306), the lower compartment (301b) terminating in a truncated collar cone (310) and being attached to a bottom side of the partition plate (302) via impeller blades (307) so as to form spacers between the cone lower compartment (301b) and the partition plate (302) and provide a peripheral opening for liquid to pass out from the lower compartment (301b) during the treatment; and a motor (232) that drives the rotary device (300) via a hollow shaft (304), the hollow shaft (304) being connected to the partition plate (320) and drawing ambient air into the lower compartment (301b) via the hole (306) in the partition plate (302), wherein, in a first treatment mode, freshly collected faeces is treated, and in a second maintenance mode, unwanted bacterial growth is inhibited within the treated material, wherein, once the process vessel is filled with faeces to a set level, defined by the inlet of the overflow feed tube (231), the first treatment mode is executed with the motor (232) driving the rotary device at a first speed of rotation to initiate stirring of the faeces inside the vessel (202) to rotate forming a vortex inside the lower compartment (301b) of the impeller (300) so that i) liquid and semi-liquid material located at or near the walls in the process vessel, in a region below the guide collar (212), will be drawn upwards and into the impeller (300) with the truncated collar cone (310) creating a suction due to the formation of the vortex so that air from the environment is sucked in through the hollow shaft and liquid is sucked in through the truncated collar cone (310) at the lower end of the impeller, and ii) faeces is thrown out through peripheral openings (308) in the upper compartment (301a) back into the upper portion (218) in the vessel (202), and wherein, the second treatment mode is executed, after the treated material has been stored in the tank (200) for a sufficient time for bacterial growth to have reached an unwanted level, with the motor (232) driving the rotary device at a second speed of rotation, the second speed being greater than the first speed, sufficient to stop the bacterial growth process, the material from the tank (200) being recirculated into the process vessel (202) for further treatment, the second speed being sufficient to cause the vortex, formed by the impeller at the lower opening, to be focused to the tube (220) and down into the aperture (221) of the tube to transport material from the bottom of the tank (200) back into the process vessel (202) to undergo further treatment.

11. The apparatus of claim 10, wherein the first speed is in a range of 750 rpm to 1000 rpm, and the second speed is 1500 rpm.

12. The apparatus of claim 10, further comprising:
a nitrate-rich supernatant drainage (228) located at a level above half of the height of tank (200) that allows liquid, usable directly as a fertilizer, to be discharged from the tank; and
phosphorous-rich sludge drainage (229) located at a lower level that allows collection of the phosphorous-rich sludge from the bottom of the tank 200.

13. The apparatus of claim 12, wherein,
the guide collar (212) is located at a height above the bottom of the vessel (202) corresponding to ⅔ to ⅔ of a total height of the vessel (202), and the guide collar (212) extends horizontally inwards from the inner circumferential wall (214) so as to leave the central opening having a diameter that is between ⅓ and ⅘ of a diameter of the vessel (202).

14. The apparatus of claim 10, further comprising a second branch tube (226) that extends the tube (220) extends upwards and opens (227) at a level above the top level of the tank 200, the second branch tube (226) defining an overflow protection tube.

* * * * *